(12) United States Patent
Radhakrishnen et al.

(10) Patent No.: US 12,524,751 B2
(45) Date of Patent: Jan. 13, 2026

(54) COMPUTER-BASED SYSTEM FOR SECURE CURBSIDE BANKING

(71) Applicant: Wells Fargo Bank, N.A., San Francisco, CA (US)

(72) Inventors: Arvind K. Radhakrishnen, Tega Cay, SC (US); Manish Dutt Purohit, Charlotte, NC (US); Anand Nair, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 353 days.

(21) Appl. No.: 18/302,668

(22) Filed: Apr. 18, 2023

(65) Prior Publication Data
US 2023/0252446 A1    Aug. 10, 2023

Related U.S. Application Data

(63) Continuation of application No. 17/154,786, filed on Jan. 21, 2021, now Pat. No. 11,636,458.

(51) Int. Cl.
*G06Q 20/30* (2012.01)
*G06Q 20/32* (2012.01)
(Continued)

(52) U.S. Cl.
CPC ....... *G06Q 20/308* (2020.05); *G06Q 20/3223* (2013.01); *G06Q 20/4015* (2020.05);
(Continued)

(58) Field of Classification Search
CPC ............ G06Q 20/308; G06Q 20/3223; G06Q 20/4015; G06Q 20/4097; G06Q 20/108;
(Continued)

(56) References Cited

U.S. PATENT DOCUMENTS 9,801,000 B2    10/2017   Shao
10,543,809 B1 *   1/2020   Carney Landow .... G08G 1/042
(Continued)

FOREIGN PATENT DOCUMENTS

CN        109034780 A     12/2018
KR       20080054276 A      6/2008

OTHER PUBLICATIONS

"Core System Requirements Specification (SyRS)", U.S. Department of Transportation, Retrieved from: https://www.its.dot.gov/meetings/pdf/CoreSystem_SE_SyRS_RevA%20(2011-06-13).pdf, Jun. 13, 2011, 131 pp.

(Continued)

*Primary Examiner* — Zeshan Qayyum
(74) *Attorney, Agent, or Firm* — Shumaker & Sieffert, P.A.

(57) ABSTRACT

Techniques discussed herein describe an example system for verifying the identity and location of a customer in a bank branch parking lot. A server determines whether to provision a service for a vehicle based on telemetry data received from a telemetry module on the vehicle in a fleet of vehicles. The telemetry data includes a first location and status information of the vehicle. The server identifies a vendor to provide the service and directs the vehicle to a second location of the vendor from the first location of the vehicle. The server provides authorization to the vehicle for an on-board transaction module to initiate a request for the service when the vehicle is at the second location of the vendor.

17 Claims, 7 Drawing Sheets

(51) Int. Cl.
*G06Q 20/40* (2012.01)
*H04W 4/46* (2018.01)
*G06V 20/56* (2022.01)

(52) U.S. Cl.
CPC .......... *G06Q 20/4097* (2013.01); *H04W 4/46* (2018.02); *G06V 20/56* (2022.01)

(58) Field of Classification Search
CPC ....... G06Q 20/32; G06Q 20/382; H04W 4/46; H04W 4/40; G06V 20/56; G06V 10/74; H04L 63/0807
USPC .......................................................... 705/75
See application file for complete search history.

(56) References Cited

U.S. PATENT DOCUMENTS

| | | | |
|---|---|---|---|
| 11,354,632 B1 | 6/2022 | Hill et al. | |
| 11,436,589 B1* | 9/2022 | Gaudin | G07F 13/025 |
| 11,455,838 B2* | 9/2022 | Baker, Sr. | G06Q 20/145 |
| 11,636,458 B1 | 4/2023 | Radhakrishnen et al. | |
| 2011/0062230 A1* | 3/2011 | Ward, II | G06Q 30/04 |
| | | | 705/13 |
| 2015/0179070 A1* | 6/2015 | Sandbrook | G07B 15/02 |
| | | | 340/932.2 |
| 2017/0127230 A1* | 5/2017 | Enriquez | H04W 4/48 |
| 2018/0218604 A1* | 8/2018 | Astigarraga | G01C 21/3685 |
| 2019/0122050 A1* | 4/2019 | Beals | G08G 1/146 |
| 2019/0158353 A1 | 5/2019 | Johnson et al. | |
| 2019/0347643 A1 | 11/2019 | Skelsey et al. | |
| 2019/0394428 A1* | 12/2019 | Nam | H04N 7/183 |
| 2020/0167824 A1 | 5/2020 | Mcclung et al. | |
| 2020/0250643 A1 | 8/2020 | Kursun et al. | |
| 2020/0279489 A1* | 9/2020 | Liu | G08G 1/20 |
| 2020/0394921 A1* | 12/2020 | Lee | G01S 19/14 |
| 2020/0408546 A1 | 12/2020 | Vaughn et al. | |
| 2022/0122458 A1* | 4/2022 | Dao | G06Q 20/145 |
| 2022/0351550 A1* | 11/2022 | Watson | G07F 15/12 |

OTHER PUBLICATIONS

Leiding et al., "Enabling the V2X Economy Revolution Using a Blockchain-based Value Transaction Layer for Vehicular Ad-hoc Networks", The 12th Mediterranean Conference on Information Systems (MCIS), 2018, 16 pp., (Applicant points out, in accordance with MPEP 609.04(a), that the year of publication, 2018, is sufficiently earlier than the effective U.S. filing date, so that the particular month of publication is not an issue.).
Notice of Allowance from U.S. Appl. No. 17/154,786 dated Dec. 22, 2022, 8 pp.
Ramalingam et al., "Conceptual analysis of Internet of Things use cases in Banking domain", IEEE, Dec. 12, 2019, pp. 2034-2039.

* cited by examiner

COMPUTER-BASED SYSTEM FOR SECURE CURBSIDE BANKING

This application is a continuation of U.S. patent application Ser. No. 17/154,786, filed Jan. 21, 2021, the entire contents of which is incorporated herein by reference.

TECHNICAL FIELD

This disclosure relates to computer-based systems for managing transactions with vehicles.

BACKGROUND

There has been an increased demand for distanced banking services in recent years. In response, many financial institutions and financial service providers have expanded services available via online banking systems and at automated teller machines. Many banking services still require a customer's physical presence and personal interaction with a human bank teller or other financial service professional for additional security and original, i.e., ink or wet, signatures. At some financial institutions, at least a portion of these "physical presence" services may be provided via a drive-through model in which a customer drives up to a speaker within view of a human bank teller and exchanges documents with the human bank teller via a window or a pneumatic tube system.

SUMMARY

In general, this disclosure describes techniques to enable a computing system of a bank branch to securely connect to a customer's vehicle that is parked in the branch's parking lot. Contactless services are becoming standard for almost every customer interaction, including bank branch services. Due in part to identity and financial security concerns, bank branches have not traditionally offered contactless services beyond check depositing and cash withdrawals via either a drive-up teller or an automated teller machine (ATM). The described techniques enable curbside banking services in which a majority of banking services can be conducted via a secure communication session between a human teller within a bank branch and the customer sitting in their vehicle in a curbside parking spot of the bank branch. To establish the secure communication session, the techniques include authentication of both the customer and the customer's vehicle via an Internet of Things (IoT) gateway device located at the curbside parking spot of the bank branch. For transactions and other services that require a visual verification of the customer's identity and/or a customer's ink or wet signature, the bank teller may walk to the customer's vehicle to complete the transactions while maintaining social distance.

Further techniques may avoid a potential privacy issue that may arise when two or more customers attempt to wirelessly connect to different IOT gateway devices at the bank branch. For example, the privacy issue may arise when a first customer parked in spot #1 wirelessly connects to an IoT gateway device for spot #2 and a second customer parked in spot #2 wirelessly connects to an IoT gateway device for spot #1. In this scenario, a first teller associated with the IoT gateway device for spot #1 interacts with the second customer parked in spot #2 and, upon walking to the vehicle parked in spot #1, may inadvertently provide the second customer's confidential documents to the first customer parked in spot #1. This disclosure describes dual authentication techniques to solve this potential privacy issue.

In some examples, a method includes establishing, by a first Internet of Things (IOT) device of a plurality of IOT devices within a computing system, a connection with a vehicle parked in a parking spot of a plurality of parking spots; transmitting, by the first IOT device, a first IOT device identifier of the first IOT device to the vehicle; receiving, by the computing system from the vehicle, an authentication token associated with a user of the vehicle, vehicle identification information, and the first IOT device identifier; authenticating, by the computing system, the user of the vehicle based on the authentication token; validating, by the computing system, that the first IOT device, to which the vehicle is connected, is associated with the parking spot in which the vehicle is parked based on the vehicle identification information, the first IOT device identifier, and image data of the vehicle's surroundings; and responsive to determining that the first IOT device to which the vehicle is connected is not associated with the parking spot in which the vehicle is parked, disconnecting, by the computing system, the first IOT device from the vehicle to enable the vehicle to reconnect to a second IOT device of the plurality of IOT devices.

In some examples, a method includes establishing, by a computing device of a vehicle, a first connection with a mobile device associated with a user of the vehicle, wherein the vehicle is parked in a parking spot of a plurality of parking spots; receiving, by the computing device of a vehicle and from the mobile device, an authentication token associated with the user of the vehicle; establishing, by the computing device of the vehicle, a second connection with a first Internet of Things (IOT) device of a plurality of IOT devices within a computing system; receiving, by the computing device of the vehicle from the first IOT device, a first IOT device identifier; transmitting, by the computing device of the vehicle and to the computing system, the authentication token associated with the user of the vehicle, vehicle identification information, surroundings information, and the first IOT device identifier; and responsive to the computing system authenticating the user based on the authentication token and validating the vehicle based on the vehicle identification information, the first IOT device identifier, and image data of the vehicle's surroundings, establishing, by the computing device of the vehicle, a third connection with a computing device of a human representative within the computing system.

In some examples a computer system comprising a plurality of IOT devices, a first IOT device of the plurality of IOT devices configured to: establish a connection with a vehicle parked in a parking spot of a plurality of parking spots, and transmit a first IOT device identifier of the first IOT device to the vehicle; and one or more computing devices within an enterprise network in communication with the plurality of IOT devices, the one or more computing devices configured to: receive, from the vehicle, an authentication token associated with a user of the vehicle, vehicle identification information, and the first IOT device identifier, authenticate the user of the vehicle based on the authentication token, validate that the first IOT device, to which the vehicle is connected, is associated with the parking spot in which the vehicle is parked based on the vehicle identification information, the first IOT device identifier, and image data of the vehicle's surroundings, and responsive to determining that the first IOT device to which the vehicle is connected is not associated with the parking spot in which the vehicle is parked, disconnect the first IOT device from the vehicle to enable the vehicle to reconnect to a second IOT device of the plurality of IOT devices.

The details of one or more examples are set forth in the accompanying drawings and the description below. Other features, objects, and advantages will be apparent from the description and drawings, and from the claims.

DETAILED DESCRIPTION

This disclosure describes techniques to perform distanced, in-person, financial services. Some existing distanced services at financial institutions use a drive-through model in which a customer drives up to a speaker within view of a human bank teller and exchanges documents with the human bank teller via a window or a pneumatic tube system. However, such a model is inefficient given the long and varying wait times for financial services. This disclosure describes a curbside approach that allows a single teller to assist multiple customers parked in a financial institution's parking lot. The techniques of this disclosure allow for a remote, secure connection between financial institution tellers and customers through dual authentication of the customer and their vehicle.

Figure 1:
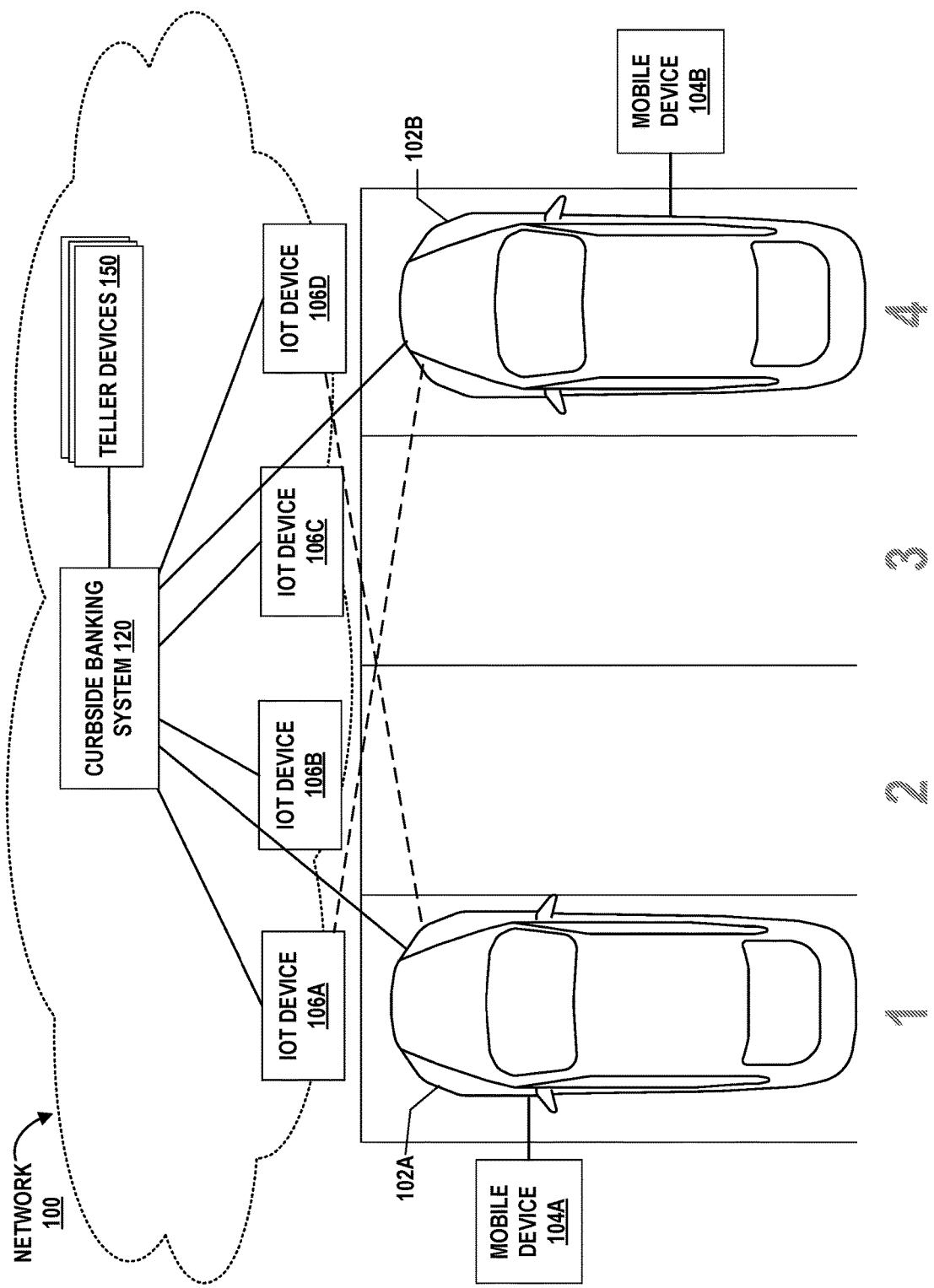
FIG. 1 illustrates an example curbside banking system configured to facilitate distanced, in-person, financial services for users in parked vehicles, in accordance with the teachings of this disclosure.

FIG. 1 illustrates an example curbside banking system 120 configured to facilitate distanced, in-person, financial services for users in parked vehicles, in accordance with the teachings of this disclosure. In the illustrated example, network 100 includes curbside banking system 120 for a financial institution that is in communication with one or more teller devices 150 at a physical bank branch location of the financial institution. Curbside banking system 120 is also in communication with Internet of Things (JOT) devices 106A-106D (collectively, "JOT devices 106"), each associated with a distinct parking spot #1-#4, respectively, at the physical bank branch location.

Curbside banking system 120 may comprise one or more physical entities (e.g., computing devices, computer servers, quantum computers, desktop computers, tablet computers, laptop computers, smartphones, etc.) and/or virtual entities (e.g., virtual machines, application software in computing machines, a cloud computing system, etc.). In certain examples, curbside banking system 120 may include one or more computers that process information and/or devices with embedded computers.

Network 100 may comprise a private network associated with the financial institution (e.g., a bank) or other entity offering financial or banking services. In other examples, network 100 may comprise a public network, such as the Internet. Although illustrated as a single entity, network 100 may comprise a combination of public and/or private networks. In some examples, network 100 may comprise one or more of a wide area network (WAN) (e.g., the Internet), a local area network (LAN), a virtual private network (VPN), or another wired or wireless communication network. In one specific example, as described in more detail below, network 100 may include a local network of the physical bank branch at which the financial or banking services are conducted, a bank network of the financial institution, and a VPN that provides a secure connection between the local network and the bank network.

As illustrated in the example of FIG. 1, a parking lot at the physical bank branch of the financial institution may have a plurality of parking spots #1-#4 designated for curbside banking, each with their own designated JOT device 106A-106D. For example, a vehicle 102A may park in a first spot (e.g., spot #1 in FIG. 1) for curbside banking corresponding to IOT device 106A, and a vehicle 102B may park in a second spot (e.g., spot #4 in FIG. 1) for curbside banking corresponding to IOT device 106D. Each of vehicles 102A and 102B may establish a connection with one of IOT devices 106 using wireless communication, such as vehicle-to-everything (V2X), radio-frequency identification (RFID), Bluetooth®, and the like.

Due to the proximity of the parking spots and the corresponding IOT devices 106, vehicle 102A parked in spot #1 may inadvertently connect to IOT device 106D associated with spot #4, while vehicle 102B may inadvertently connect to IOT device 106A (the connections are illustrated by dashed lines in FIG. 1). If this connection setup were allowed to progress, a bank teller using one of teller devices 150 at the bank branch to communicate with a user of vehicle 102A may mistakenly believe that vehicle 102A is parked in parking spot #4 associated with IOT device 106D to which vehicle 102A is connected. This presents a security risk as the bank teller may approach vehicle 102B, which is actually parked in spot #4, for signatures and confirmation on confidential documents prepared for the user of vehicle 102A based on the connection between vehicle 102A and IOT device 106D associated with spot #4.

The techniques of this disclosure may provide a solution to the above-described security risk by requiring a dual authentication procedure for each user and each vehicle that wishes to engage in curbside banking. For a first user of vehicle 102A, a mobile device 104A of the user may first receive an authentication token from one or more computing devices within a bank network, which may be included in network 100. Mobile device 104A may receive the authentication token via a mobile banking application executed on mobile device 104A. The authentication token may be issued based on identification information and/or credentials provided by the user via the mobile banking application running on mobile device 104A to access one or more accounts held by the user at the financial institution. Mobile device 104A may transfer the authentication token to vehicle 102A via a banking application executed on electronic components of vehicle 102A, such that vehicle 102A becomes the authentication token holder.

A connection may be established between one of IOT devices 106 and vehicle 102A via the banking application executed on electronic components of vehicle 102A. Depending on a type of wireless communication used to establish the connection between vehicle 102A and one of IOT devices 106, a portion or all of IOT devices 106 may be within a connecting distance of vehicle 102. For example, V2X communication has a range that may exceed 1 kilometer, while RFID and Bluetooth each have ranges that may exceed 100 meters. Vehicle 102A may establish the connection with the one of IOT devices 106 perceived to be the closest to vehicle 102A based on signal strength and/or an order to signal receipt from IOT devices 106.

In the example of FIG. 1, vehicle 102A parked in spot #1 may initially establish a connection to IOT device 106D associated with spot #4. IOT device 106D may transmit an IOT device identifier that uniquely identifies IOT device 106D to vehicle 102A. Curbside banking system 120 then receives the authentication token, the IOT device identifier, and vehicle identification information (e.g., make, model, vehicle identification number (VIN), license plate number, and the like) from vehicle 102A. In some examples curbside banking system 120 may receive the information directly from vehicle 102A via the banking application executed on electronic components of vehicle 102A. In other examples curbside banking system 120 may receive information from vehicle 102A through IOT device 106D via the banking application executed on electronic components of vehicle 102.

Vehicle 102A or curbside banking system 120 may collect surroundings information for vehicle 102A based on the immediate surroundings of vehicle 102A when parked in spot #1. In some examples, vehicle 102A captures image data of its surroundings using one or more sensors, e.g., a backup camera, included in the circuitry of vehicle 102A. In other examples, curbside banking system 120 collects image data of the surroundings of vehicle 102A (e.g., via image capture devices and associated circuitry included at the physical bank branch).

After receiving the authentication token associated with the user of vehicle 102A, the vehicle identification information, and the IOT device identifier for IOT device 106D from vehicle 102A, curbside banking system 120 may authenticate the user of vehicle 102A based on the authentication token. Curbside banking system 120 may also attempt to verify the parking spot in which vehicle 102A is parked by comparing the surroundings information for vehicle 102A to the vehicle identification information and the IOT device identifier received from vehicle 102A. In the example of FIG. 1, curbside banking system 120 determines that the surroundings information for vehicle 102A (e.g., image data of the "1" indicating the number of the parking spot in which vehicle 102A is parked) does not match with the expected surroundings information for spot #4 associated with IOT device 106D to which vehicle 102A is connected.

Based on the determining that IOT device 106D to which vehicle 102A is connected is not associated with the parking spot #1 in which vehicle 106A is parked, curbside banking system 120 may disconnect vehicle 102A from the currently connected IOT device 106D, and instruct vehicle 102 not to reconnect to IOT device 106D. Vehicle 106A may then attempt to establish a new connection with one of IOT devices 106A-106C. The process may be repeated until curbside banking system 120 verifies that vehicle 102A is connected to IOT device 106A associated with parking spot #1 in which vehicle 102A is parked.

Figure 2:
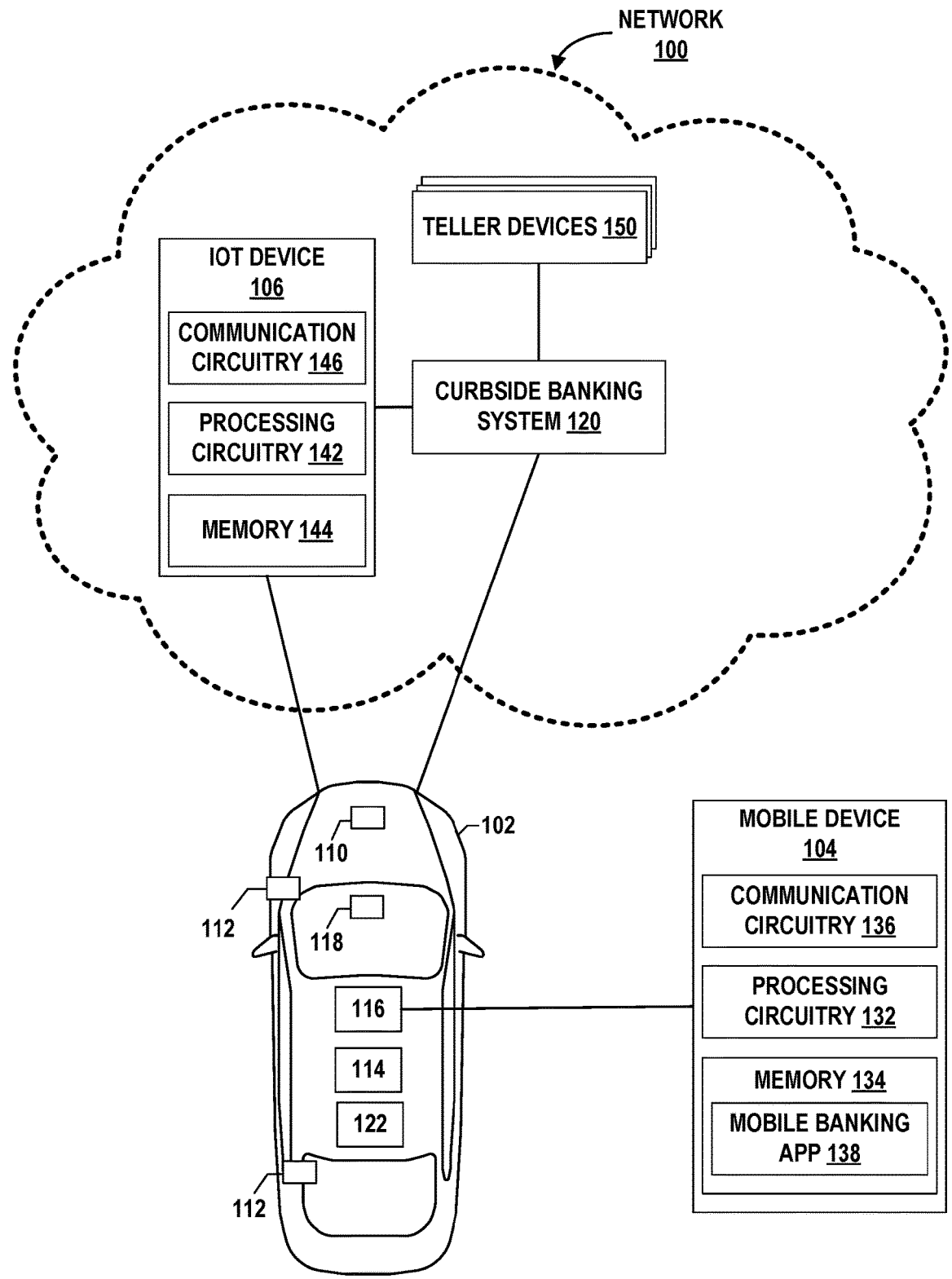
FIG. 2 illustrates the curbside banking system of FIG. 1 in communication with an example vehicle requesting distanced, in-person, financial services for a user of the vehicle, in accordance with the teachings of this disclosure.

FIG. 2 illustrates the curbside banking system of FIG. 1 in communication with an example vehicle 106 requesting distanced, in-person, financial services for a user of the vehicle, in accordance with the teachings of this disclosure.

In the illustrated example of FIG. 2, vehicle 102, mobile device 104, IOT device 106, and curbside banking system 120 may establish connections and transmit information so that one or more computing devices within curbside banking system 120 can authenticate the identity of a user of vehicle 102 and validate that vehicle 102 is located in a parking spot corresponding to the correct IOT device 106. Specifically, mobile device 104 connects to vehicle 102 and sends an authentication token for the user of vehicle 102 to vehicle 102, IOT device 106 connects to vehicle 102 and sends an IOT device identifier, and vehicle 102 then sends vehicle identification information (e.g., make, model, vehicle identification number (VIN), license plate number, etc.) as well as the received authentication token and IOT device identifier to curbside banking system 120. Curbside banking system 120 verifies the accuracy of the information, and either connects vehicle 102 to one of teller devices 150, or disconnects IOT device 106 from vehicle 102 and directs vehicle 102 to connect to another IOT device.

Mobile device 104 may be a user computing device such as a laptop computer, tablet computer, so-called "smart" phone, "smart" pad, or other personal digital appliance equipped for wireless communication. Mobile device 104 includes processing circuitry 132, memory 134 storing a mobile banking application 138, and communication circuitry 136.

Processing circuitry 132, in some examples, may include one or more processors that are configured to implement functionality and/or process instructions for execution within mobile device 104, one or more other devices, or any combination thereof. For example, processing circuitry 132 may be capable of processing instructions stored in memory 134. Processing circuitry 132 may include, for example, microprocessors, digital signal processors (DSPs), application specific integrated circuits (ASICs), field-programmable gate arrays (FPGAs), or equivalent discrete or integrated logic circuitry, or a combination of any of the foregoing devices or circuitry. Accordingly, processing circuitry 132 may include any suitable structure, whether in hardware, software, firmware, or any combination thereof, to perform the functions ascribed herein to processing circuitry 132.

Memory 134 may include a computer-readable storage medium or computer-readable storage device. In some examples, the memory includes one or both of a short-term memory or a long-term memory. The memory may include, for example, random access memories (RAM), dynamic random-access memories (DRAM), static random access memories (SRAM), magnetic discs, optical discs, flash memories, or forms of electrically programmable memories (EPROM) or electrically erasable and programmable memories (EEPROM). In some examples, memory 134 is used to store program instructions for execution by processing circuitry 132. Memory 134 may be used by software or applications running on mobile device 104 (e.g., mobile banking application 138) to temporarily store information during program execution.

Communication circuitry 136 includes wireless network interfaces to enable communication with other devices. The communication circuitry 136 facilitates communication between mobile device 104 and vehicle 102 and/or communication between mobile device 104 and one or more communication networks, e.g., a telecom network, the Internet, or one or more public or private networks such as network 100. Communication circuitry 136 may work in conjunction with processing circuitry 132, memory 134, and software to control the wireless network interfaces. For example, the mobile device may include an electronic subscriber identification module (eSIM) to support communicating via one or more cellular networks.

Mobile banking application 138 may be implemented as a downloadable or pre-installed application or "app" that is executed by processing circuitry 132 of mobile device 104. Mobile banking application 138 facilitates secure access to financial accounts in an online banking system by an authorized user of mobile device 104. For example, mobile banking application 138 may communicate with a server of a bank network within network 100 that supports the online banking system. Mobile banking application 138 may support a login user interface of the online banking system on an interface device, e.g., a display, of mobile device 104 through which the user of mobile device 104 may enter their access credentials and log into the online banking system. Mobile banking application 138 may also support receipt of an authorization token from the online banking system once the user has been authenticated, and transmission of the authorization token to vehicle 102 in which the user and mobile device 104 are located.

IOT device 106 includes processing circuitry 142, a memory 144, and communication circuitry 146. Processing circuitry 142, in some examples, may include one or more processors that are configured to implement functionality and/or process instructions for execution within IOT device 106, one or more other devices, or any combination thereof. For example, processing circuitry 142 may be capable of processing instructions stored in memory 144. Processing circuitry 142 may include, for example, microprocessors, DSPs, ASICs, FPGAs, or equivalent discrete or integrated logic circuitry, or a combination of any of the foregoing devices or circuitry. Accordingly, processing circuitry 142 may include any suitable structure, whether in hardware, software, firmware, or any combination thereof, to perform the functions ascribed herein to processing circuitry 142.

Memory 144 of IOT device 106 may include a computer-readable storage medium or computer-readable storage device. In some examples, memory 144 includes one or both of a short-term memory or a long-term memory. The memory may include, for example, RAM, DRAM, SRAM, magnetic discs, optical discs, flash memories, or forms of EPROM or EEPROM. In some examples, memory 144 is used to store program instructions for execution by processing circuitry 142. For example, memory 144 may store at least the IOT device identifier used to uniquely identify IOT device 106 from among the other IOT devices included at the physical bank branch of the financial institution.

Communication circuitry 146 includes wireless network interfaces to enable communication with other devices. Communication circuitry 146 may facilitate communication between IOT device 106 and vehicle 102 and/or communication between IOT device 106 and a curbside banking system 120. The communication circuitry 146 may work in conjunction with processing circuitry 142, memory 144, and software to control the wireless network interfaces. The wireless network interfaces of communication circuitry 146 may include Ethernet interfaces, optical transceivers, radio frequency (RF) transceivers, Wi-Fi or Bluetooth radios, V2X transceivers, or any other type of devices that can send and receive information. In some examples, communication circuitry 146 of IOT device 106 may be configured to connect to standards-based networks (e.g., local area wireless networks (including IEEE 802.11 a/b/g/n/ac or others), personal area networks (including Bluetooth®, Bluetooth® Low Energy, Zigbee®, Z-wave®, near field communication (NFC), etc.), and/or wide area networks (e.g., GSM®, Long Term Evolution (LTE)™; WiMAX (IEEE 802.16), WiGig (IEEE 802.11ad/ay, etc.), ultra-wideband communication (5G), etc.), or other types of wireless communication networks.

In response to detecting a presence of vehicle 102 proximate to IOT device 106 or receiving an interrogating signal from vehicle 102 proximate to IOT device 106, communication circuitry 146 of IOT device 106 sends the IOT device identifier stored in memory 144 to vehicle 102. Whether a vehicle is "proximate" to IOT device 106 may be determined based on a certain range or connecting distance from IOT device 106 that may be defined by the communication standard used between vehicle 102 and IOT device 106. For example, V2X communication has a range that may exceed 1 kilometer, while RFID and Bluetooth each have ranges that may exceed 100 meters.

Curbside banking system 120 may be a collection of one or more computing devices interconnected in network 100, that operate together to perform the functions of curbside banking system 120. As described in more detail below with respect to FIG. 4, curbside banking system 120 may comprise computing devices spread across multiple, geographically-disparate locations and network types. For example, curbside banking system 120 may include IOT devices, including IOT device 106, and teller devices 150 within a local network of a physical bank branch of a financial institution offering the financial or banking services, servers and other computing devices within the bank network of the financial institution, and a VPN that provides a secure connection between the local network and the bank network.

Vehicle 102 may be a standard gasoline powered vehicle, a hybrid vehicle, an electric vehicle, a fuel cell vehicle, and/or any other mobility implement type of vehicle. Vehicle 102 includes parts related to mobility, such as a powertrain with an engine, a transmission, a suspension, a driveshaft, and/or wheels, etc. Vehicle 102 may be non-autonomous, semi-autonomous (e.g., some routine motive functions controlled by vehicle 102), or autonomous (e.g., motive functions are controlled by vehicle 102 without direct driver input). Vehicle 102 may include various electronic components including sensors 110, electronic control units (ECUs) 112, a telemetry module 114, an on-board communications platform 116, a user interface module 118, and an on-board transaction module 122.

Sensors 110 may be arranged in and around vehicle 102 in any suitable fashion. Sensors 110 may include camera(s), sonar, RADAR, LiDAR, ultrasonic sensors, optical sensors, or infrared devices configured to measure properties around the exterior of vehicle 102. Additionally, some sensors 110 may be mounted inside the passenger compartment of vehicle 102 or in the body of vehicle 102 (such as, the engine compartment, the wheel wells, etc.) to measure properties in the interior of vehicle 102. For example, such sensors 110 may include accelerometers, odometers, pitch and yaw sensors, wheel speed sensors, cameras, microphones, and thermistors, tire pressure sensors (e.g., TMPS systems), biometric sensors, etc. Sensors 110 may be configured to capture image data of at least a portion of the surroundings of vehicle 102. Sensors 110 provide information that can be used to determine the status of vehicle 102.

ECUs 112 are hardware units that monitor and/or control a function or a group of functions on vehicle 102. ECUs 112 may cooperate by transmitting data (e.g., sensor data, control signals, status information, etc.) over one or more vehicle data buses (e.g., data bus 202 of FIG. 3 below). ECUs 112 may incorporate and/or be communicatively coupled to one or more of the sensors 110. ECUs 112 may include, for example, a steering control unit that controls and monitors the power steering system of vehicle 102, a braking control unit that controls and monitors an anti-lock braking system, a transmission control unit that controls transmission functions and shifting based on a transmission fluid temperature sensor, a brake pedal position sensor, a throttle position sensor, and/or an engine control unit that manage an air fuel mixture and emission control systems of vehicle 102 based off input from sensors 110 in the engine compartment, etc. ECUs 112 are discrete sets of electronics that include their own circuit(s) (such as integrated circuits, microprocessors, memory, storage, etc.) and firmware, sensors, actuators, and/or mounting hardware.

Telemetry unit 114 compiles information about vehicle 102 and/or driver performance by collecting data from sensors 110 and/or ECUs 112 within vehicle 102. For example, telemetry unit 114 may collect data related to vehicle emissions via a catalytic converter sensor, piston misfiring via a crankshaft position sensor, fuel mixture monitoring via the engine control unit, etc. In some examples, telemetry unit 114 collects diagnostic information from ECUs 112 in a diagnostic mode when the diagnostic mode is available. In examples where vehicle 102 is part of a vehicle fleet, telemetry unit 114 may compile raw data to be transmitted to the fleet management system, or telemetry unit 114 may perform some data processing (e.g., sorting, aggregation, filtering, validating, etc.) before the data is transmitted.

On-board communications platform 116 includes wireless network interfaces to enable network communication with devices and networks. For example, on-board communications platform 116 may facilitate communication directly between vehicle 102 and IOT device 106 and/or facility communication between vehicle 102 and curbside banking system 120 via network 100. On-board communications platform 116 also includes hardware (e.g., processors, memory, storage, etc.) and software to control the wireless network interfaces and connect to standards-based networks (e.g., local area wireless networks (including IEEE 802.11 a/b/g/n/ac or others), personal area networks (including Bluetooth®, Bluetooth® Low Energy, Zigbee®, Z-wave®, near field communication (NFC), etc.), and/or wide area networks (e.g., GSM®, Long Term Evolution (LTE)™; WiMAX (IEEE 802.16), WiGig (IEEE 802.11ad/ay, etc.), ultra-wideband communication (5G), etc.)). For example, on-board communications platform 116 may include an electronic subscriber identification module (eSIM) to support communicating via one or more cellular networks.

In the illustrated example, telemetry unit 114 is separate from on-board communications platform 116. However, in some examples, telemetry unit 114 may be incorporated into on-board communications platform 116. In some examples, telemetry unit 114 and/or on-board communications platform 116 may be referred to as an IOT device (e.g., when telemetry unit 114 and/or on-board communications platform 116 are a third party device installed after vehicle 102 is manufactured, etc.).

In some examples, the on-board communications platform 116 includes a global positioning system (GPS) receiver (or any other satellite-based location system) to determine a current geographical location of the vehicle 102. On-board communication platform 116 also includes a vehicle communication system unit that includes hardware, antenna(s), radio(s) and software to broadcast messages and to establish connections to proximate devices, such as IOT device 106, via V2X communication. The vehicle communication system may comprise a dedicated short range communication (DSRC) unit that facilitates wireless local area network (WLAN)-based V2X communication using the underlying wireless radio communication protocols. Alternatively, the vehicle communication system may comprise a cellular V2X or C-V2X unit that facilitates cellular-based V2X communication using the underlying mobile telecommunications protocols.

For example, on-board communications platform 116 may facilitate communication directly between vehicle 102 and IOT device 106 using V2X communication. The example DSRC unit may, for example, implement the DSRC protocol as specified by the U.S. Department of Transportation's Core June 2011 System Requirements Specification (SyRS) report (available at www.its.dot.gov/meetings/pdf/ CoreSystem_SE_SyRS_RevA%20(2011-06-13).pdf)). In other examples, the DSRC unit or the C-V2X unit may implement communication protocols used to communicatively couple vehicles, roadside units, and/or mobile devices and may be implemented by one of the standards-based networks described above.

On-board transaction module 122 facilitates the requests for distanced, in-person, financial services for a user, e.g., a driver or a passenger, of vehicle 102. User interface module 118 may include a display device (e.g., a central console display, an infotainment head unit, etc.) to present a graphical user interface (GUI) of on-board transaction module 122 and receive requests for financial services from the user of vehicle 102. In other examples, on-board communications platform 116 may facilitate communication between vehicle 102 and a user computing device, e.g., mobile device 104 or another mobile phone, a tablet computer, or laptop computer, within vehicle 102 such that the GUI of on-board transaction module 122 may be presented on mobile device 104.

Figure 3:
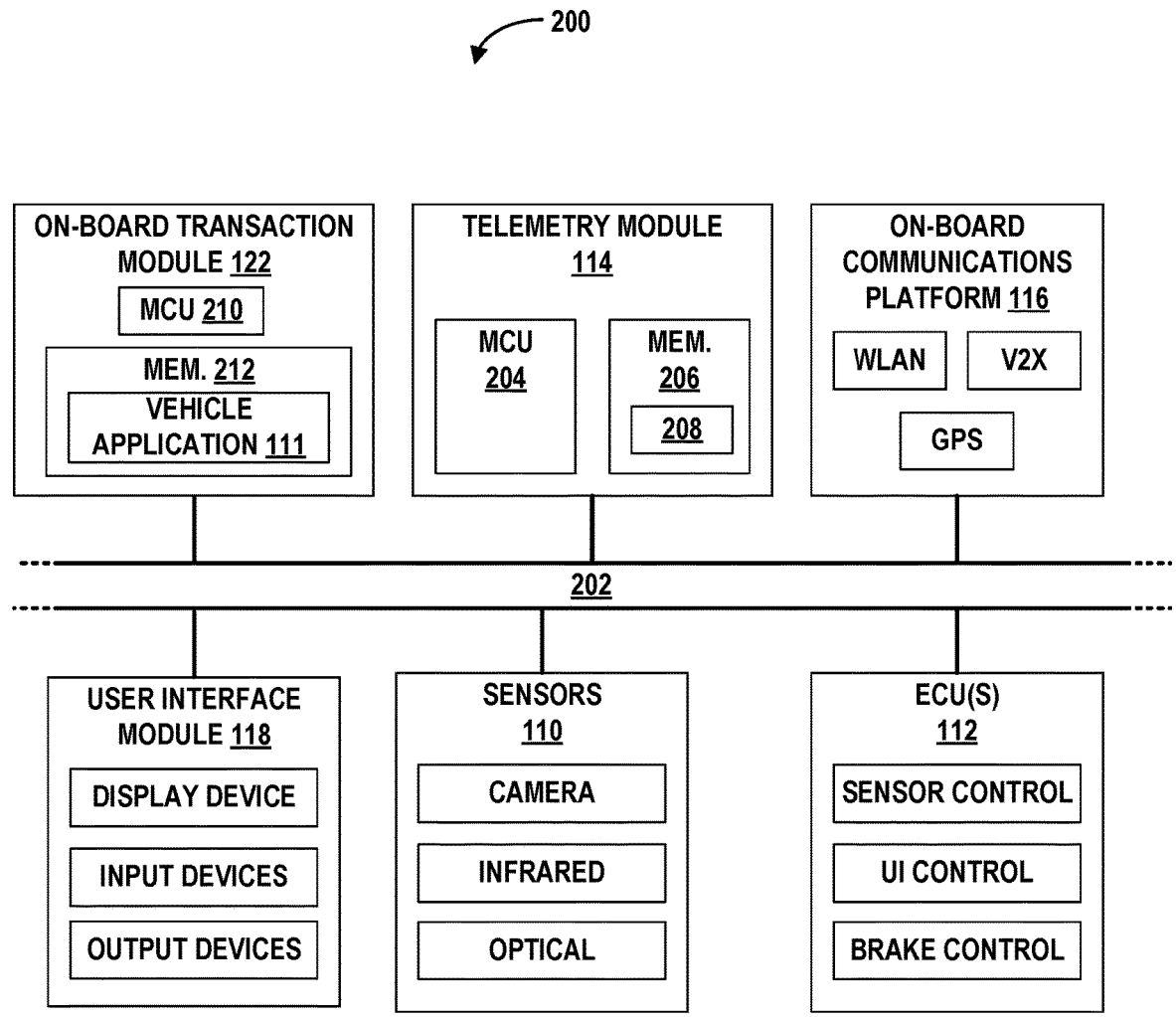
FIG. 3 is a block diagram illustrating examples of electronic components of the vehicle of FIG. 2 in further detail.

FIG. 3 is a block diagram illustrating examples of electronic components of the vehicle of FIG. 2 in further detail. In the illustrated example, the electronic components 200 include sensors 110, ECUs 112, telemetry module 114, on-board communications platform 116, user interface module 118, and on-board transaction module 122. In the illustrated example, telemetry module 114, on-board communications platform 116, sensors 110, ECUs 112, user interface module 118, and on-board transaction module 122 are separate electronic components (e.g., systems-on-a-chip (SoCs), integrated circuits, electronic control units, controllers, etc.). However, in some examples, telemetry module 114, on-board communications platform 116, user interface module 118, and on-board transaction module 122 may be rearranged and/or combined, etc.

In the illustrated example, telemetry unit 114 includes a processor (e.g., a microcontroller (MCU)) 204 and memory 206. In the illustrated example, memory 206 stores telemetry firmware 208, which when executed b processor 204, causes telemetry unit 114 to collect diagnostic information from sensors 110 and/or ECUs 112. The diagnostic information includes, for example, information relating to a status and condition of vehicle 102 over time (e.g., speed, location, engine temperature, piston timing, fuel level, tire pressure, fluid levels, accelerometer data, etc.).

In the illustrated example, on-board transaction module 122 includes a processor, e.g., MCU 210, and memory 212. In the illustrated example, memory 212 stores vehicle application 111, which when executed by processor 210, allows vehicle 102 to perform tasks attributed to vehicle 102 or its components in accordance with this disclosure.

Vehicle application 111 may be a banking application or an independent application executed processor 210 of vehicle 102. Vehicle application 111 may use on-board communications platform 116 to communicate with any one or more of IOT device 106, mobile device 104, curbside banking system 120, or any other device. The user of vehicle 102 may interact with application 111 through a GUI presented by user interface module 118.

In the illustrated example, user interface module 118 includes a display device, input devices, and output devices. Vehicle application 111, when executed by processor 210, may cause user interface module 118 to present on the display device and/or the other output devices (e.g., via a central console display or an infotainment head unit of vehicle 102 or via mobile device 104 within vehicle 102) a GUI of vehicle application 111 and receive requests for financial services from the user of vehicle 102 via the input devices. In some examples, user interface module 118 may also support a video streaming application to facilitate an audio and/or video connection between the user of vehicle 102 and a bank teller of one of teller devices 150 within network 100 to discuss the requested financial services. In the illustrated example, user interface module 118 includes a display device, input devices, and output devices as separate units. However, the display device may be a touch screen device or other device with input and output devices integrated into the display device.

Processors 204 and 210 may be any suitable processing device or set of processing devices such as, but not limited to, a microprocessor, a microcontroller-based platform, an integrated circuit, one or more FPGAs, and/or one or more ASICs. Memory 206 and 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, memory 206 and 212 includes multiple kinds of memory, particularly volatile memory and non-volatile memory.

Memory 206 and 212 is computer readable media on which one or more sets of instructions, such as the software for operating the methods of the present disclosure, can be embedded. The instructions may embody one or more of the methods or logic as described herein. For example, the instructions reside completely, or at least partially, within any one or more of memory 206 and 212, the computer readable medium, and/or within processors 204 and 210 during execution of the instructions.

Sensors 110 may be arranged in and around vehicle 102 in any suitable fashion. Sensors 110 may include cameras, sonar, RADAR, LiDAR, ultrasonic sensors, optical sensors, or infrared devices configured to measure properties around the exterior of vehicle 102. Sensors 110 may be configured to image a portion of the surroundings of vehicle 102.

One or more vehicle data buses 202 may communicatively couple sensors 110, the ECUs 112, the telemetry module 114, the on-board communications platform 116, the user interface module 118. For example, a first data bus may couple sensors 110 and ECUs 112 to the telemetry module 114 and a second separate data bus that is encrypted may communicatively couple the user interface module 118 to the on-board communications platform 116. The vehicle data bus may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
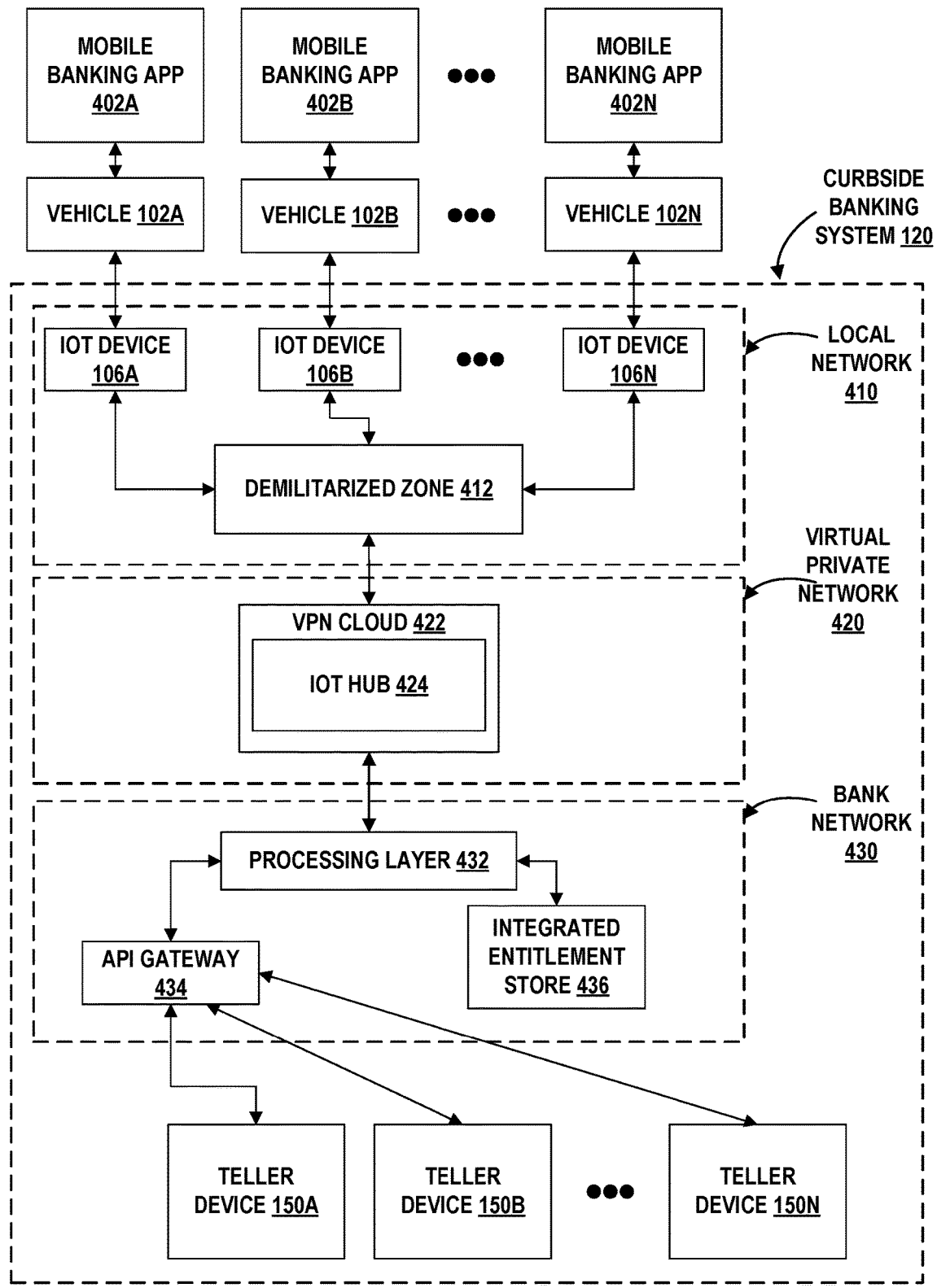
FIG. 4 is a block diagram illustrating example components of the curbside banking system of FIG. 1, in accordance with the teachings of this disclosure.

FIG. 4 is a block diagram illustrating example components of curbside banking system 120 of FIG. 1, in accordance with the teachings of this disclosure. The techniques of this disclosure are frequently described herein as applied to one of mobile banking applications 402A-402N (collectively, "mobile banking apps 402") interacting with one of vehicles 102A-102N (collectively, "vehicles 102"), and the one of vehicles 102 interactive with one of IOT devices 106A-106N (collectively, "IOT devices 106") and a corresponding one of teller devices 150A-150N (collectively, "teller devices 150"). The techniques apply equally to two or more of financial institution apps 402 and vehicles 102 simultaneously or sequentially interacting with any of IOT devices 106 and corresponding teller devices 150. Although FIG. 4 illustrates lines of communication between each of vehicles 102 and curbside banking system 120 only through respective IOT devices 106, in some examples each of vehicles 102 may communicate directly with computing devices within DMZ 412.

A mobile device 104 may receive an authentication token for a user of vehicle 102 based on authentication of the user with a bank network 430 via a mobile banking application 402 executed on mobile device 104. Mobile banking application 402 may be substantially similar to mobile banking application 138 of FIG. 2. The authentication token may be based on identification information and credentials associated with the user of vehicle 102. For example, the authentication token may be associated with a name, date of birth, social security number, and/or any number of other personally identifiable information found in a financial institution customer profile. Authentication of the user by bank network 430 provides the user with access to the user's accounts at the financial institution via mobile banking app 402. Mobile banking application 402 running on mobile device 104 may transfer the authentication token to a vehicle 102 through a vehicle application 111 running on vehicle 102.

In some examples, the mobile banking app 402 integrates with the vehicle application 111 through an interoperability standard (i.e. MirrorLink®, etc.). In some examples, the mobile banking app 402 establishes a communication with the vehicle application 111 through wireless means (Bluetooth, NFC, LTE, IEEE, etc.). The vehicle application 111 running on vehicle 102 may be institution nonspecific, allowing vehicle users to obtain branch services regardless of financial provider. The vehicle application 111 may adjust available interactivity options based on the financial institution to which a vehicle user is attempting to connect.

Vehicle 102 becomes the holder of the authentication token in place of mobile device 104 and persists the authentication token. Thus, vehicle 102 also has access to the account of the user of vehicle 102 who is using mobile banking application 402 and persists that information as well.

Vehicle 102 may discover a nearby IOT device 106 within the parking lot of a physical bank branch of the financial institution through the vehicle application 111 that is part of a local network 410 in curbside banking system 120. Vehicle 102 may use a vehicle-to-everything (V2X) protocol to discover the IOT device. There may be any one or more IOT devices 106A-106N within connecting distance of vehicle 102. Vehicle 102 may select an IOT device 106 to connect to based on the perceived proximity of IOT device 106. For example, vehicle 102 may attempt connection between itself and detected IOT device 106 with the strongest signal, or vehicle 102 may attempt connection between itself and the first IOT device 106 signal it receives or detects.

Once vehicle 102 and IOT device 106 have established a connection, IOT device 106 may transfer an IOT device identifier to the vehicle. The IOT device identifier may include associated parking spot number/identifier (i.e. IOT device serial number, etc.).

Vehicle 102 may use sensors 110 to gather vehicle surroundings information. Vehicle surroundings information may also be gathered by image capture devices or other sensors at the bank branch that may be included within curbside banking system 120. Vehicle surroundings information may include image data including photographs and video, radar data, sonar data, RADAR, LiDAR, ultrasonic sensors data, optical sensors data, infrared data, etc.

Vehicle 102 may send the authentication token, the IOT device identifier, vehicle surroundings information (if gathered by the vehicle), and vehicle identification information (i.e. make, model, VIN, license plate number, etc.) to one or more computing devices within a demilitarized zone (DMZ) 412 within the local network 410. Vehicle 102 may send the information directly to one or more computing devices within DMZ 412 or through IOT device 106 to one or more computing devices within DMZ 412. The one or more computing devices within DMZ 412 may send the acquired information through a VPN network 420 to an IOT hub 424 within a VPN cloud 422. IOT hub 424 may be a centralized point for collecting authentication information from vehicles at multiple bank branches within a district, state, or potentially country.

IOT hub 424 may then send the acquired information from vehicle 102 to one or more computing devices within a processing layer 432 within a bank network 430. The one or more computing devices within processing layer 432 may include one or more processors which may be of any suitable processing device or set of processing devices such as, but not limited to, a microprocessor, a microcontroller-based platform, an integrated circuit, one or more FPGAs, and/or one or more ASICs. The one or more computing devices within processing layer 432 may authenticate the authentication token through interaction with an integrated entitlement store 436, including comparing existing customer profile data to that provided with the authentication token. The one or more computing devices within processing layer 432 may also verify the vehicle identification information as corresponding to the customer profile data.

The one or more computing devices within processing layer 432 may also analyze the vehicle surroundings information to determine if it matches a parking spot corresponding to the IOT device identifier. If processing layer 432 determines that the authentication token is valid, and that the vehicle surroundings information corresponds to the IOT device identifier, then the processing layer may connect vehicle 102 to a teller device 150. Once the teller device 150 and vehicle 102 are connected, they may share information like video, audio, and other data.

The teller device 150 may be any computing device (i.e. desktop, laptop, tablet, phone, etc.) of a financial institution employee. The teller device 150 will receive the vehicle surroundings information, IOT device identifier, and the determined parking spot from processing layer 432.

Figure 5:
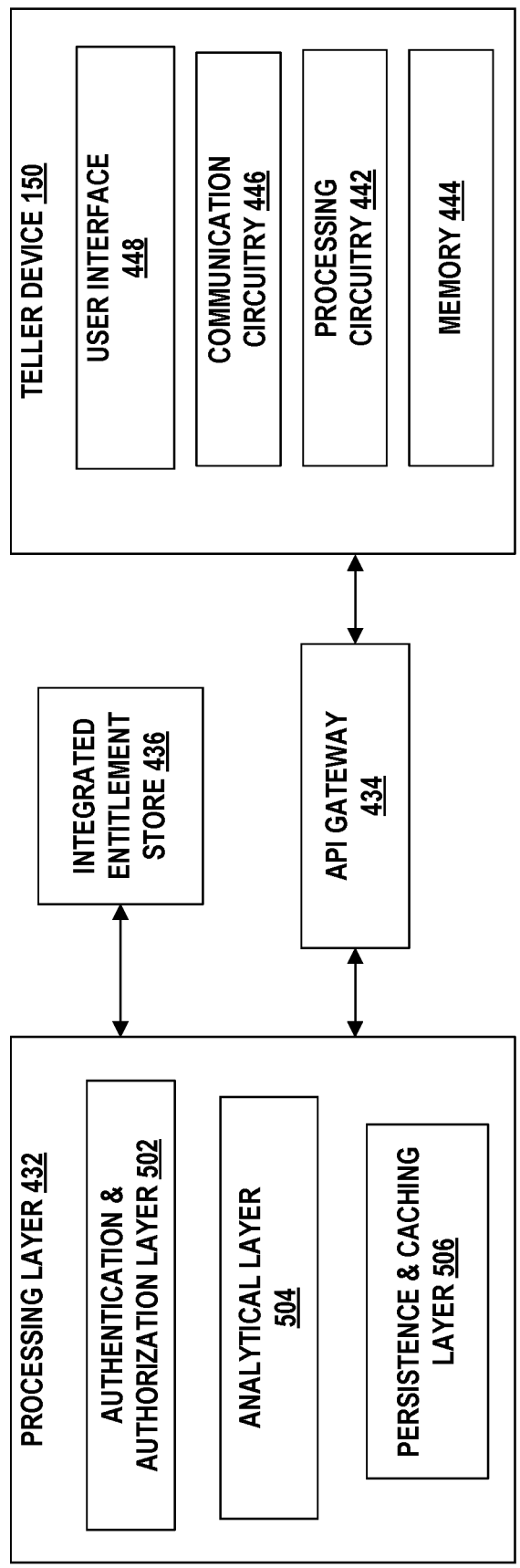
FIG. 5 is a block diagram illustrating example components of the bank network of FIG. 4 in further detail.

FIG. 5 is a block diagram illustrating example components of bank network 430 of FIG. 4 in further detail.

Processing layer 432 may include an authentication and authorization layer 502, an analytical layer 504, and a persistence and caching layer 506, all of which assist in the functions of the processing layer through the processing circuitry of one or more computing devices. Processing layer 432 may interact with the integrated entitlement store 436 in order to enable the authorization token. Processing layer 432 may include analytical layer 504 which controls communication and data transmission with teller device(s) 150 through API gateway 434. During a session in which a user of vehicle 102 is connected to curbside banking system 120, data relevant to that user's transactions with curbside banking system 120 (including authentication of the authentication token) may be cached in persistence and caching layer 506 to enable quick access by one or more devices of the curbside banking system 120. When the connection between vehicle 102 and curbside banking system 120 is terminated, the data relevant to that user's transactions with curbside banking system 120 may be cleared from persistence and caching layer 506.

Processing layer 432 interacts with teller device(s) 150 through an application programming interface (API) gateway 434. Teller device 150 may have a user interface 448, communication circuitry 446, processing circuitry 442, and a memory 444. In the illustrated example, user interface 448, communication circuitry 446, processing circuitry 442, and memory 444 are separate electronic components. However, in some examples, user interface 448, communication circuitry 446, processing circuitry 442, and memory 444 may be rearranged and/or combined, etc.

In some examples the user interface 448 may include a display device, sound output device, microphone, and a video streaming application so that the financial institution employee may establish a visual and audible connection to the user of vehicle 102.

Communication circuitry 446 may include wired and wireless network interfaces to enable communication with other devices. The communication circuitry 446 may facilitate communication between vehicle 102, processing layer 432, and the teller device 150. The communication circuitry 446 may work in conjunction with processing circuitry 442, memory 444, and software to control the network interfaces. For example, the IOT device may be configured to connect to standards-based networks (e.g., local area wireless networks (including IEEE 802.11 a/b/g/n/ac or others), personal area networks (including Bluetooth®, Bluetooth® Low Energy, Zigbee®, Z-wave®, NFC, etc.), and/or wide area networks (e.g., GSM®, LTE™; WiMAX (IEEE 802.16), WiGig (IEEE 802.11ad/ay, etc.), ultra-wideband communication (5G), etc.), or other types of wireless communication.

Processing circuitry 442, in some examples, may include one or more processors that are configured to implement functionality and/or process instructions for execution within teller device 150, one or more other devices, or any combination thereof. For example, processing circuitry 442 may be capable of processing instructions stored in memory 444. Processing circuitry 442 may include, for example, microprocessors, DSPs, ASICs, FPGAs, or equivalent discrete or integrated logic circuitry, or a combination of any of the foregoing devices or circuitry. Accordingly, processing circuitry 442 may include any suitable structure, whether in hardware, software, firmware, or any combination thereof, to perform the functions ascribed herein to processing circuitry 442.

The memory 444 may include a computer-readable storage medium or computer-readable storage device. In some examples, the memory includes one or both of a short-term memory or a long-term memory. The memory may include, for example, RAM, DRAM, SRAM, magnetic discs, optical discs, flash memories, or forms of EPROM or EEPROM. In some examples, the memory is used to store program instructions for execution by processing circuitry 442.

Figure 6:
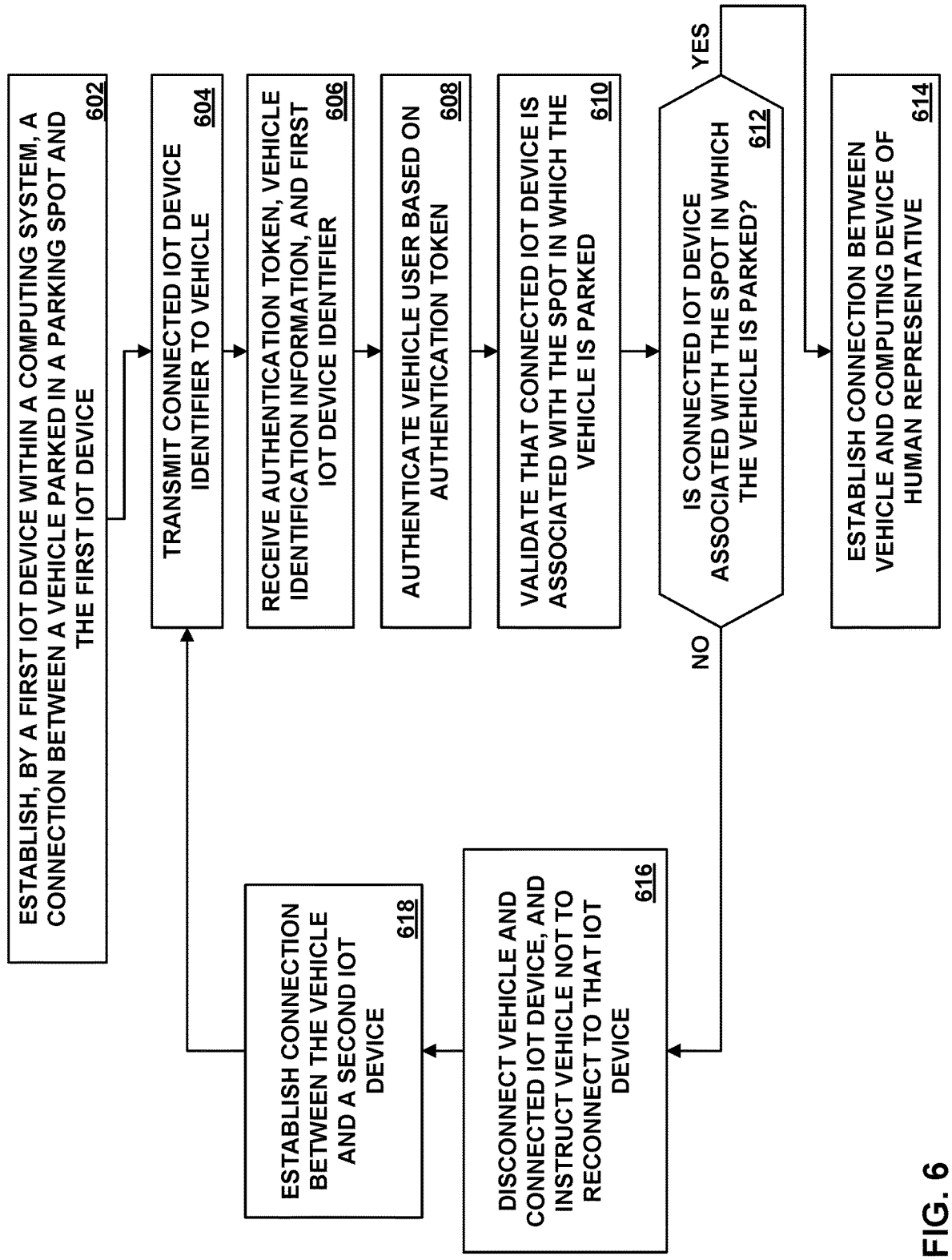
FIG. 6 is a flowchart illustrating an example operation of the curbside banking system performing dual authentication of a vehicle and a user of the vehicle, in accordance with the teachings of this disclosure.

FIG. 6 is a flowchart illustrating an example operation of curbside banking system 120 performing dual authentication of a vehicle and a user of the vehicle, in accordance with the teachings of this disclosure.

First a connection is established by a first IOT device 106A within curbside banking system 120 between a vehicle 102 parked in a parking spot and the first IOT device 106A (602). Then IOT device 106A transmits an IOT device identifier for IOT device 106A to vehicle 102 (604).

Curbside banking system 120 thereafter receives an authentication token, vehicle information, and the IOT device identifier from vehicle 102 (606). Curbside banking system 120 may receive the token and information from vehicle 102 directly or through IOT device 106A to which vehicle 102 is connected. The authentication token is associated with a user of vehicle 102, and may indicate the that user has previously been authenticated by the bank network via a mobile banking application running on the user's mobile device. The vehicle information may include identifying information for vehicle 102 such as license plate number, VIN, make, model, etc. The IOT identifier may contain a serial or similar number for IOT device 106A that is unique to device 106A and identifies it distinctly from other IOT devices 106B-106N, as well as the parking spot number with which IOT device 106A is associated.

Curbside banking system 120 then authenticates the user of the vehicle based on the authentication token (608). Curbside banking system 120 may compare the information from the authentication token to information in memory of curbside banking system 120 and verify that it matches a recent authentication of the user stored in memory.

Afterwards, curbside banking system 120 validates that vehicle 102 is parked in the parking spot associated with the IOT device identifier assigned to IOT device 106A (610). Curbside banking system 120 may accomplish this through data collected of the vehicle's 102 immediate surroundings. Vehicle 102 may collect vehicle surroundings data using sensors integrated with vehicle 102. Alternatively, curbside banking system 120 may include sensors capable of gathering vehicle surroundings data. Vehicle surroundings data may include image data gathered by the image capture devices or other sensors positioned near the parking spot in which vehicle 102 is parked. Curbside banking system 120 may include a memory storing surroundings data for each parking spot in a financial institution's parking lot corresponding to a parking spot eligible for curbside banking and to which an IOT device may be assigned. By comparing the vehicle surroundings data to surroundings data in memory, curbside banking system 120 may find a match and determine that vehicle 102 is parked in the parking spot associated with the surroundings data in memory. Curbside banking system 120 may determine whether the parking spot associated with the surroundings data in memory is the same as the parking spot associated with the IOT device identifier. If the parking spots are the same (YES branch of 612), the vehicle's 102 location is validated. If the parking spots are not the same (NO branch of 612), curbside banking system 120 may determine that vehicle 102 is connected to an incorrect IOT device.

If the vehicle's 102 location is validated (YES branch of 612), curbside banking system 120 may establish a connection between vehicle 102 and a teller device 150 that is operated by a human representative (614). The human representative may then proceed with any financial transactions with verification of exactly where the user of the car is parked. Particularly for transactions that require the human representative to approach the user of the car with documents to sign or deliver to the user of the car. In this way the human representative does not inadvertently present the wrong person with the confidential information of another.

If the vehicle's 102 location is invalidated (YES branch of 612), curbside banking system 120 may terminate the connection between vehicle 102 and IOT device 106A, while instructing vehicle 102 not to try reconnecting to IOT device 106A (616). Curbside banking system 120 may then attempt to establish a connection between vehicle 102 and a second IOT device 106B (618). Choosing which next IOT device 106 to establish a connection may be determined iteratively, by measuring the signal strength between vehicle 102 and one or more IOT devices 106 within range of the vehicle's communications circuitry. A connection may be established where the signal strength is the strongest of all IOT devices 106 in range that have not already been invalidated by curbside banking system 120. Alternatively, choosing which next IOT device 106 to establish a connection may be deemed by whichever IOT device 106 is detected by vehicle 102 first. Although this step describes only a "second" IOT device, this process may continue with a third, fourth, etc. IOT device until curbside banking system 120 validates that the connected IOT device 106A-N is associated with the spot in which vehicle 102 is parked, or there are no more IOT devices 106A-N to which vehicle 102 can connect that have not already been tried.

In some examples, curbside banking system 120 may determine which IOT device 106 vehicle 102 should be connected to and instruct vehicle 102 to establish a connection with said IOT device 106. At any time after receiving the vehicle surroundings data, curbside banking system 120 may compare the vehicle surroundings data to each surroundings data stored in memory corresponding to available parking spots for the specific parking lot in which vehicle 102 is parked. If curbside banking system 120 finds a match, curbside banking system 120 may determine that vehicle 102 is parked in the parking spot corresponding to the spot associated with the matched surroundings data in memory. Curbside banking system 120 may also determine, based on IOT device data stored in memory, which IOT device 106A-106N is associated with the determined parking spot. After determining that vehicle 102 is connected to an invalid IOT device 106A and instructing vehicle 102 to disconnect from IOT device 106A, curbside banking system 120 may instruct the vehicle to establish a connection with IOT device 106B-N determined to correspond to the parking spot in which curbside banking system 120 determined vehicle 102 was parked.

Figure 7:
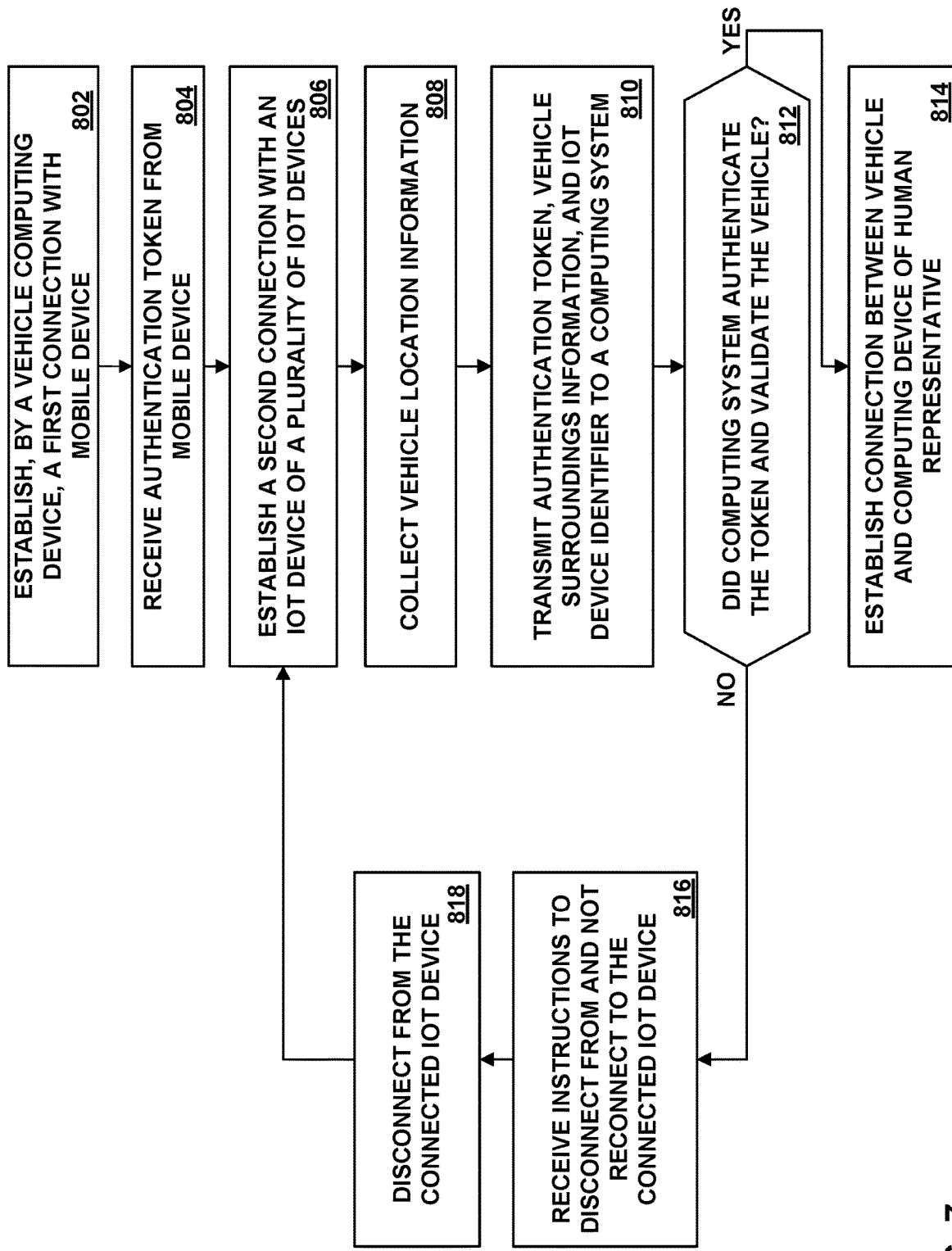
FIG. 7 is a flowchart illustrating an example operation of a vehicle providing authentication information for a user and for the vehicle itself to the curbside banking system, in accordance with the teachings of this disclosure.

FIG. 7 is a flowchart illustrating an example operation of a vehicle providing authentication information for a user and for the vehicle itself to curbside banking system 120, in accordance with the teachings of this disclosure.

A vehicle 102 may establish a first connection with a mobile device 104 of a user of the vehicle according to techniques described in this disclosure (802). The connection may make use of a mobile application on mobile device 104 and a vehicle application 111. Vehicle 102 may then receive an authentication token from mobile device 104 through the connection (804). Once the authentication token has been received, the vehicle may establish a second connection with a proximate IOT device 106 of a plurality of proximate IOT devices 106A-106N (806). The vehicle may choose to connect to the one IOT device 106A of the plurality of IOT devices 106A-106N that has the strongest signal strength with vehicle 102, or may choose to connect to the one IOT device 106A of the plurality of IOT devices 106A-106N based on other criteria. Vehicle 102 may receive IOT device identifier from IOT device 106A to which vehicle 102 establishes the second connection.

Vehicle 102 may then collect vehicle surroundings information using sensors 110 integrated with the vehicle in accordance with techniques described by this disclosure (808). Afterwards, vehicle 102 may transmit the authentication token, vehicle surroundings information, IOT device identifier, and vehicle identification information from memory in the vehicle to curbside banking system 120 (810).

Vehicle 102 may then receive confirmation of whether curbside banking system 120 has authenticated the authentication token and validated the vehicle's 102 surroundings information (812). If curbside banking system 120 authenticates the authentication token and validates the vehicle's 102 surroundings information (YES branch of 812), vehicle 102 may then establish a connection with a teller device 150 operated by a human representative of a financial institution (814). The user of the vehicle may then engage in financial transactions with the representative of the financial institution.

If vehicle 102 receives notification that curbside banking system 120 has not authenticated the authentication token, or has invalidated the vehicle's 102 surrounding information (NO branch of 812), vehicle 102 may then receive instructions from curbside banking system 120 to disconnect from IOT device 106A and not to reconnect to IOT device 106A (816). Vehicle 102 may then disconnect from IOT device 106A (818). Afterwards, vehicle 102 may establish a connection with another IOT device 106B-106N based on criteria described above (806). This process may be performed iteratively until vehicle 102 receives notification that the authentication token has been authenticated and vehicle 102 surroundings information has been validated.

The techniques described in this disclosure may be implemented, at least in part, in hardware, software, firmware or any combination thereof. For example, various aspects of the described techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include RAM, read only memory (ROM), programmable read only memory (PROM), EPROM, EEPROM, flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
    establishing, by an Internet of Things (IOT) device of a plurality of IOT devices within a computing system, a connection with a vehicle parked in a parking spot of a plurality of parking spots;
    transmitting, by the IOT device, an IOT device identifier of the IOT device to the vehicle;
    receiving, by the computing system from the vehicle, vehicle identification information and the IOT device identifier; and
    validating, by the computing system, that the IOT device, to which the vehicle is connected, is associated with the parking spot in which the vehicle is parked based on the vehicle identification information, the IOT device identifier, and image data of the vehicle's surroundings.

2. The method of claim 1, further comprising:
    responsive to validating that the IOT device to which the vehicle is connected is associated with the parking spot in which the vehicle is parked, connecting the vehicle to a computing device of a human representative within the computing system.

3. The method of claim 1, wherein the IOT device comprises a second IOT device, the method further comprising:
    determining that a first IOT device of the plurality of IOT devices to which the vehicle is connected is not associated with the parking spot in which the vehicle is parked; and
    responsive to determining that the first IOT device to which the vehicle is connected is not associated with the parking spot in which the vehicle is parked, disconnecting, by the computing system, the first IOT device from the vehicle to enable the vehicle to connect to the second IOT device of the plurality of IOT devices.

4. The method of claim 3, further comprising:
    responsive to determining that the first IOT device to which the vehicle is connected is not associated with the parking spot in which the vehicle is parked, directing, by the computing system, the vehicle not to reconnect to the first IOT device.

5. The method of claim 3, further comprising:
    determining, by the computing system, if at least a portion of the image data is associated with the second IOT device of the plurality of IOT devices, and
    responsive to determining that at least a portion of the image data is associated with the second IOT device, directing, by the computing system, the vehicle to connect to the second IOT device.

6. The method of claim 3, further comprising comparing the image data of the vehicle's surroundings to image data stored in memory of a first parking spot associated with the first IOT device to which the vehicle is connected; and
based on the image data of the vehicle's surroundings not matching the image data stored in memory of the first parking spot associated with the first IOT device, determining that the first IOT device is not associated with the parking spot in which the vehicle is parked.

7. The method of claim 1, further comprising collecting, by one or more image capture devices within the computing system, the image data of the vehicle's surroundings.

8. The method of claim 1, further comprising receiving, by the computing system from the vehicle, the image data of the vehicle's surroundings along with the vehicle identification information and the IOT device identifier.

9. The method of claim 1, wherein validating that the IOT device to which the vehicle is connected is associated with the parking spot in which the vehicle is parked further comprises:
comparing the image data of the vehicle's surroundings to image data stored in memory of a first parking spot associated with the IOT device to which the vehicle is connected; and
based on the image data of the vehicle's surroundings matching the image data stored in memory of the first parking spot associated with the IOT device, determining that the IOT device is associated with the parking spot in which the vehicle is parked.

10. The method of claim 1, further comprising:
receiving an authentication token associated with a user of the vehicle; and
authenticating, by the computing system, the user of the vehicle based on the authentication token.

11. The method of claim 10, wherein receiving the authentication token associated with the user of the vehicle, the vehicle identification information, and the IOT device identifier comprises:
receiving, by at least one computing device of a demilitarized zone (DMZ) of the computing system, the authentication token associated with the user of the vehicle, the vehicle identification information, and the IOT device identifier from the IOT device of the plurality of IOT devices;
receiving, by an IOT hub device within a cloud virtual private network (VPN) of the computing system, the authentication token associated with the user of the vehicle, the vehicle identification information, and the IOT device identifier from the at least one computing device of the DMZ; and
receiving, by one or more computing devices executing a processing layer within the computing system, the authentication token associated with the user of the vehicle, the vehicle identification information, and the IOT device identifier from the IOT hub device within the cloud VPN.

12. The method of claim 11, wherein authenticating the user of the vehicle comprises authenticating, by the one or more computing devices of the processing layer, the user of the vehicle based on the authentication token.

13. A computer system comprising:
a plurality of IOT devices, an IOT device of the plurality of IOT devices configured to:
establish a connection with a vehicle parked in a parking spot of a plurality of parking spots, and
transmit an IOT device identifier of the IOT device to the vehicle; and
one or more computing devices within an enterprise network in communication with the plurality of IOT devices, the one or more computing devices configured to:
receive, from the vehicle, vehicle identification information and the IOT device identifier, and
validate that the IOT device, to which the vehicle is connected, is associated with the parking spot in which the vehicle is parked based on the vehicle identification information, the IOT device identifier, and image data of the vehicle's surroundings.

14. The computer system of claim 13, wherein the one or more computing devices are further configured to:
receive an authentication token associated with a user of the vehicle; and
authenticate, by the computing system, the user of the vehicle based on the authentication token.

15. The computer system of claim 13, wherein the one or more computing devices are further configured to, responsive to validating that the IOT device to which the vehicle is connected is associated with the parking spot in which the vehicle is parked, connect the vehicle to a computing device of a human representative within the computing system.

16. The computer system of claim 13, wherein the IOT device comprises a second IOT device, and wherein the one or more computing devices are further configured to:
determine that a first IOT device of the plurality of IOT devices to which the vehicle is connected is not associated with the parking spot in which the vehicle is parked;
responsive to determining that the first IOT device to which the vehicle is connected is not associated with the parking spot in which the vehicle is parked:
disconnect, by the computing system, the first IOT device from the vehicle to enable the vehicle to connect to the second IOT device of the plurality of IOT devices, and
direct the vehicle not to reconnect to the first IOT device.

17. The computer system of claim 16, wherein the one or more computing devices are further configured to:
determine if at least a portion of the image data is associated with the second IOT device of the plurality of IOT devices, and
responsive to determining that at least a portion of the image data is associated with the second IOT device, direct the vehicle to connect to the second IOT device.

* * * * *